US006758992B2

(12) United States Patent
Solomon et al.

(10) Patent No.: US 6,758,992 B2
(45) Date of Patent: Jul. 6, 2004

(54) PROCESS OF STRIPE COATING TO PRODUCE MICROSTRUCTURED COMPOSITE ARTICLES

(75) Inventors: Jeffrey L. Solomon, Vadnais Heights, MN (US); Scott Melvyn Tapio, Falcon Heights, MN (US); Daniel W. Hennen, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 520 days.

(21) Appl. No.: 09/795,988

(22) Filed: Feb. 28, 2001

(65) Prior Publication Data

US 2003/0164575 A1 Sep. 4, 2003

(51) Int. Cl.[7] .............................................. B29D 11/00
(52) U.S. Cl. ..................... 264/1.6; 264/1.7; 264/172.19
(58) Field of Search .................... 264/1.6, 1.7, 1.36, 264/1.38, 166, 167, 172.19, 259; 427/162

(56) References Cited

U.S. PATENT DOCUMENTS

| | | | |
|---|---|---|---|
| 3,689,346 A | 9/1972 | Rowland | |
| 3,935,359 A | 1/1976 | Rowland | |
| 4,420,502 A | 12/1983 | Conley | |
| 4,463,467 A | 8/1984 | Grüber et al. | |
| 4,576,850 A | 3/1986 | Martens | |
| 4,668,558 A | 5/1987 | Barber | |
| 5,175,030 A | 12/1992 | Lu et al. | |
| 5,183,597 A | 2/1993 | Lu | |
| 5,410,006 A | 4/1995 | Tachibana et al. | |
| 5,814,355 A | 9/1998 | Shusta et al. | |
| 6,071,443 A | 6/2000 | Osawa et al. | |

FOREIGN PATENT DOCUMENTS

| | | |
|---|---|---|
| EP | 0 799 686 A1 | 10/1997 |
| EP | 882 998 | * 12/1998 |
| JP | 6-67002 | 3/1994 |
| JP | 3-9301 | 1/1999 |
| WO | WO 95/11464 | 4/1995 |

* cited by examiner

Primary Examiner—Mathieu D. Vargot
(74) Attorney, Agent, or Firm—Douglas B. Little

(57) ABSTRACT

Described is a process for producing a microstructured composite article including the steps of: providing a tool with a molding surface that is suitable for forming a microstructure; applying to at least a portion of the molding surface a plurality of lines of a flowable, curable resin composition; contacting the resin composition with a substrate; curing the resin composition; and, transferring the resin composition to the substrate. Alternative embodiments include heating the molding surface or resin composition, or both, to aid in the flow of the resin composition. The advantage of this process is that is that the microstructured composite articles are able to be produced at high speed and are free of air bubbles.

19 Claims, 1 Drawing Sheet

PROCESS OF STRIPE COATING TO PRODUCE MICROSTRUCTURED COMPOSITE ARTICLES

TECHNICAL FIELD

This invention relates generally to a process for producing microstructured composite articles, and more particularly to a process for producing such articles by applying resin composition used in the article in lines on a microstructured molding surface. The resin composition wicks and flows along grooves in the microstructured molding surface to coat the surface before the resin composition is cured, thereby resulting in a composite article that is free of air bubbles, and that is able to be made rapidly. The molding surface or the resin composition, or both, may be optionally heated to allow the resin composition to more quickly and easily fill the grooves in the molding surface.

BACKGROUND

Microreplication is a process used to make and duplicate microstructured surfaces. Microreplication is used to produce a wide range of products, one example being optical films. Microreplication of optical films, for example, can dramatically alter the optical properties of the surface.

In general, it is difficult to replicate high-quality, microstructured surfaces at rapid line speeds. The problem that occurs at rapid line speeds is that air bubbles are trapped in the replicated microstructure, thereby affecting the properties of the surface of the end product. The air bubbles are a result of air being trapped in recesses in the negative molding surface used for replication while the molding surface is being coated with the resin composition that forms the microstructured surface. Effectively, the resin composition does not displace all the air in the recesses and air bubbles result.

A well-known coating method used to replicate a microstructured surface is a continuous coating method. U.S. Pat. No. 3,689,346 (Rowland) teaches a process for continuous replication of retroreflective cube-corner sheeting by applying a layer of crosslinkable, partially polymerized resin over a negative molding surface to be replicated, and exposing the resin to actinic light or heat to solidify the resin. This process does result in replicated surfaces without air bubbles at very slow line speeds. However, air bubbles result from the process at rapid line speeds.

There is another method that is used to replicate microstructured composite articles. This process, as described in Japanese Patent Laid-Open Publication No. 9301/1991 describes a process for producing a lens sheet, comprising the steps of coating a first radiation curable resin onto the entire surface of a forming die in the shape of a flat plate; forming a resin bank of a second radiation curable resin on the first radiation curable resin; and superposing a laminating base material on the second radiation curable resin; and uniformly laying the second radiation curable resin over the first radiation curable resin while forcing out, by the use of a pressure roll, those air bubbles that enter between the base material and the forming die. Although this method may eliminate the air bubbles, it is so time consuming that it does not allow for production of articles at a high rate of speed.

SUMMARY OF INVENTION

The inventors recognized the need for a process that allows high-quality microstructured composite articles, that are free of air bubbles, to be produced at rapid line speeds. The present invention meets the need that exists for such a process.

A first aspect of the present invention is a process for producing a microstructured composite article comprising: providing a tool with a molding surface that is suitable for forming a microstructure; applying to at least a portion of the molding surface a plurality of continuous lines of a flowable, curable resin composition; contacting the resin composition with a substrate; curing the resin composition; and, transferring the resin composition to the substrate.

A second aspect of the present invention is a process for producing a microstructured composite article comprising: providing a tool comprising a molding surface comprising a plurality of grooves that are suitable for forming a microstructure and that are non-circular in shape; applying to at least a portion of said molding surface a plurality of lines of a flowable, curable resin composition in a direction that is non-parallel to said plurality of grooves; contacting said resin composition with a substrate; curing said resin composition; and transferring said resin composition to said substrate.

A third aspect of the present invention is a process for producing a microstructured composite article comprising: providing a tool comprising a molding surface that is suitable for forming a microstructure; heating said molding surface; applying to at least a portion of said molding surface a plurality of lines of a flowable, curable resin composition; contacting said resin composition with a substrate; curing said resin composition; and transferring said resin composition to said substrate.

Another aspect of the present invention is the process as described directly above in the third aspect, and further comprising heating said flowable, curable resin composition before applying said resin composition to said molding surface.

A further aspect of the present invention is a process for producing a microstructured composite article comprising: providing a tool comprising a molding surface comprising a plurality of grooves that are suitable for forming a microstructure; applying to at least a portion of said molding surface a plurality of lines of a flowable, curable resin composition; applying to at least a portion of a substrate said flowable, curable resin composition; contacting said resin composition on said molding surface with said substrate after said resin composition is applied to said substrate; curing said resin composition; and transferring said resin composition on said molding surface to said substrate.

One advantage of at least one embodiment of the present inventive method is that it is successful in producing microstructured composite articles that are free of air bubbles. It also allows them to be made at rapid line speeds.

Another advantage of the present inventive method is that the coating die used to deposit the resin composition on the molding surface does not need to be positioned as close to the molding surface as in other processes. In other processes, coating a continuous layer of resin onto the tool requires the die to be close to the molding surface, which increases the potential of damaging the tool.

The above summary of the present invention is not intended to describe each embodiment or every implementation of the present invention. The figures and the detailed description, which follow, more particularly exemplify those embodiments. In addition, the above and other advantages are more fully shown and described in the drawings and detailed description of this invention. It is to be understood, however, that the drawings and description are for purposes of illustration only and should not be read in a manner that would unduly limit the scope of this invention.

In this application:

"bubble-free" or "free from air bubbles" or "free of bubbles" refer to the microstructured composite article produced by the present inventive process being free of, or without any, air bubbles as observed by the unaided human eye under ambient light conditions:

"cross-hatched" means two sets of grooves that are intersecting and cross each other;

"cross web" refers to a direction about perpendicular to the down web direction;

"down web" refers to the lengthwise direction of the web, or the direction of the web that extends in the machine direction, which is the direction of movement of the substrate as it is moved in the present inventive method;

"flowable" means capable of moving freely in the manner characteristic of a fluid;

"groove" means a long and narrow furrow, channel, depression, hollow or indentation; and "molding surface" means the surface of an object used to give a particular shape to a substance.

BRIEF DESCRIPTION OF FIGURES

The invention may be more completely understood in consideration of the following detailed description of various embodiments of the invention in connection with the accompanying drawing, in which.

Figure 1:
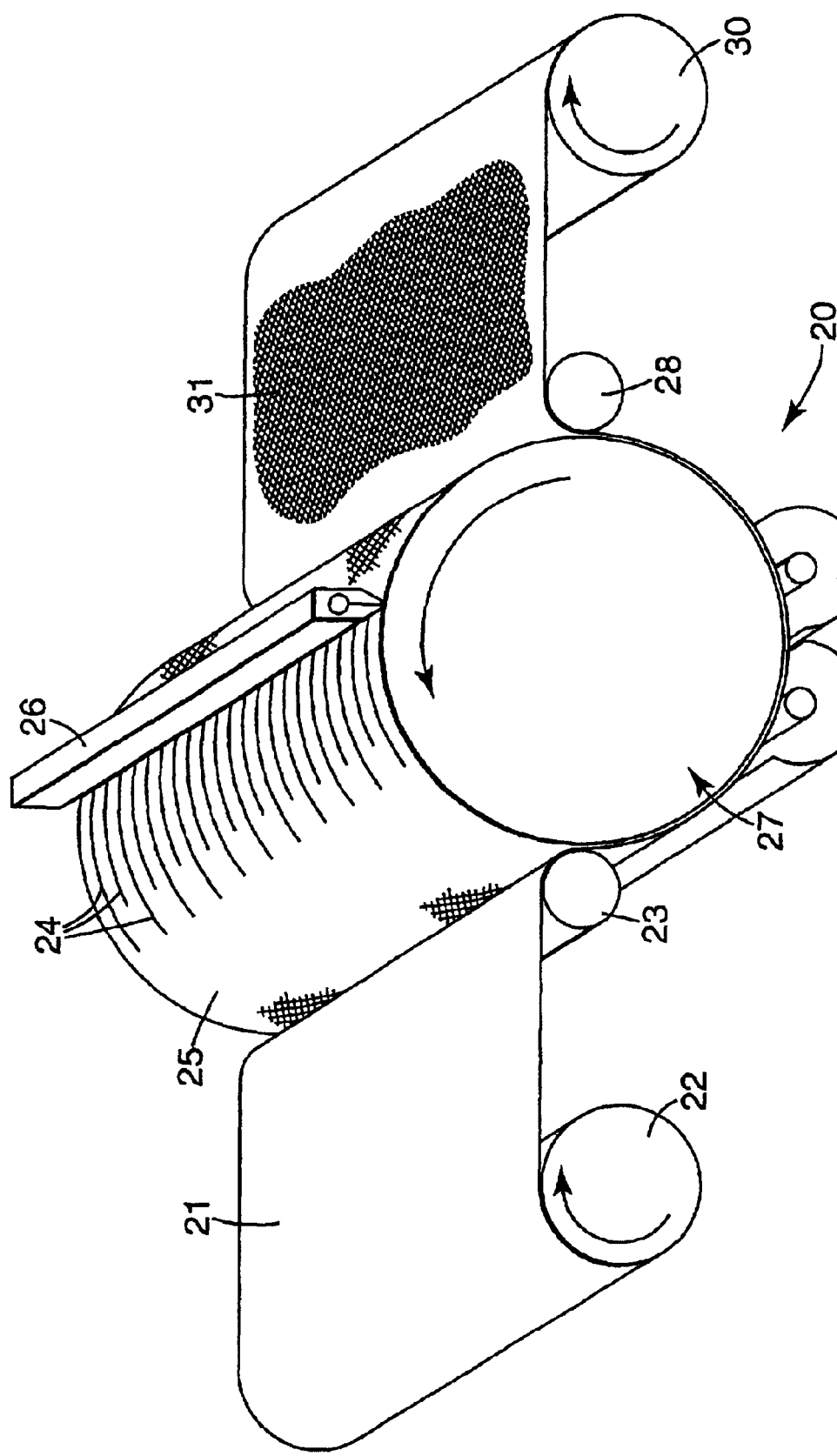
FIG. 1 is a perspective view of one exemplary process configuration for practice of the process of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Tool

The present invention can be carried out according to the following procedure. First, the process comprises providing a tool comprising a molding surface that is suitable for forming a microstructured composite article comprising a curable resin composition. The tool used in the present inventive process can be a belt, a sheet, a flat die, a roll, a sleeve mounted on a roll, or other possible configurations. The specific type of tool used depends upon the article that is being produced. It also depends upon whether the process is a continuous or a batch process. For example, the tool used to make microstructured composite articles in a continuous process could be a roll that is mounted onto a machine that is powered by a power-driven motor that causes the roll to rotate. Another example of a tool that could be used, if the present inventive process is carried out using a batch process, is a flat sheet or die. The present inventive process is not limited to one type of tool, however, and many different types of tools may be used to carry out the inventive process.

An illustrative example of material used to make a tool useful in the present inventive process is electroform nickel. U.S. Pat. No. 4,478,769 (Pricone et al.) teaches a method of forming an electroformed tool. The electroformed tool may then be used as a sheet in a batch process or mounted onto a roll.

The tool that may be used in the present inventive process may optionally be sufficiently transparent to allow photo-curing of the microstructured article comprising resin composition through the tool itself. Such a transparent tool may be made of a thermoplastic material, for example. The particular material used for the tool, however, will depend on the type of article to be made and whether the process used is continuous or batch. For example, the glass transition temperature of the tool must be higher than that of the resin composition used to form the microstructured surface in cases where either the resin composition or the tool, or both, are heated.

If tool is transparent to radiation, the source of the radiation could reside inside the tool itself. This would cause the curable coating to be irradiated first on the side closest to the tool.

The tool in the present inventive process comprises a molding surface. The molding surface is suitable for forming a microstructure, which means that it is structured such that it is the negative of the microstructure that is desired to be formed on the produced article. The molding surface may include structures of various types that will produce the desired microstructure. In some of the embodiments described herein, the molding surface comprises a plurality of grooves. The plurality of grooves has the shape and size suitable for forming the desired microstructure. The top of each groove on the molding surface corresponds to the bottom of a resultant groove on the microstructured composite article. The plurality of grooves is shaped such that the pattern of the grooves results in the desired microstructure on the end product. For example, the shape of the plurality of grooves in some of the embodiments of the present inventive method include, but are not limited to, a circular shape, a non-circular shape, a linear shape, a sinusoidal shape, and a cross-hatched shape.

The tool should be such that the plurality of grooves, or other structures on the molding surface, will not deform undesirably during production of the article. In addition, the molding surface should be made such that the cured resin composition can be separated therefrom. Therefore, it should be made of a material that affords good release from the cured resin composition.

In an alternative embodiment, the inventive process further comprises heating the molding surface to an increased temperature. In this embodiment, the tool could further comprise a heating element of some kind, which would result in the molding surface of the tool being heated to an increased temperature. The increased temperature effectively lowers the viscosity of the resin composition that is applied to the molding surface, which aids in the flow of the resin composition across the molding surface.

Another example of a tool that may have its molding surface heated to an increased temperature is a tool that comprises a cylinder on which the molding surface is located, with the cylinder being placed over a heated roll. However, many different tool configurations may be used in this embodiment of the inventive process.

Lines of Resin Composition

Second, the inventive process comprises applying to said molding surface a plurality of lines of a flowable, curable resin composition. The resin composition should be applied in lines such that the resin composition flows into the grooves in the molding surface and wicks along the grooves to substantially fill the grooves. Applying the resin composition in this linear, or striped, fashion can prevent air bubbles from being trapped under the layer of resin composition, which will result in a high-quality, bubble-free microstructured composite article being produced.

Since the present inventive process requires that the lines of resin composition wick or spread across the molding surface, the structure of the molding surface needs to allow the lines of resin composition to wick and cover the molding surface.

If the structure or pattern of the plurality of grooves, for example, is linear, the plurality of grooves should be arranged such that they are non-parallel to the lines of resin composition being applied. If they were parallel, the resin composition would not be able to wick along and fill all of the grooves unless the lines of resin composition were closer together than the grooves on the molding surface.

If the plurality of grooves is circular, or linear and non-parallel to the lines of resin composition, or sinusoidal in shape, the resin composition can wick along the grooves and substantially fill them, and the difference in interval between the lines of resin composition and the grooves is not a material factor. The lines of resin composition must also be close enough together so that the lines ultimately flow together to substantially coat the microstructured surface of the molding surface. With a circular groove pattern, some portion of the grooves may run parallel to the lines of resin composition. If that is the case, the lines of resin composition may not completely fill the grooves in that section of the tool. However, if sufficient resin is applied the grooves will be filled as the substrate contacts the tool.

Another shape or arrangement of grooves that is possible with the present invention is cross-hatched grooves. This arrangement includes two different sets of grooves that cross and intersect each other at an angle. In such an arrangement, the lines of resin composition must be sufficiently close enough together to enable the two sets of grooves to be filled with resin composition when the resin composition flows and wicks along the grooves. If the lines of resin composition are applied in a down-web direction and are parallel to one of the sets of grooves, then the lines of resin composition being applied must be closer together than the spacing of the grooves that are parallel to the down web direction. However, both sets of grooves can be configured such that they are at an angle to the down web direction.

It may be desirable to apply lines of resin composition on only a portion of the molding surface. Therefore, the present invention is not limited to, nor does it exclude, applying resin composition in lines on the entire molding surface.

In some embodiments of the present inventive process, the lines of resin composition are continuous. The continuous lines are lines without interruption or cessation. Continuous lines help to ensure that each of the grooves on the molding surface is substantially filled with resin composition.

The thickness of the lines of resin composition that are applied to the molding surface is important in the present inventive process. The lines of resin composition should be thick enough so that they flow or wick across the molding surface and flow together with an adjacent line or lines of resin composition applied on the molding surface. However, the lines of resin composition should not be so thick that they are touching before the resin composition flows or wicks across the molding surface. If that were to occur, air bubbles may be trapped.

The distance or interval between the lines of resin composition is important to the present inventive process. If they are too close together air bubbles may be trapped. However, if they are too far apart, adjacent lines of resin composition may not be able to wick or flow together enough to substantially cover the molding surface. The examples described below provide examples of distances between lines of resin composition that are effective. The spacing of the lines of resin composition should be such that the resin composition is applied to the molding surface in independent lines, and such that resin composition from adjacent lines can meet on the molding surface as it flows or wicks across the molding surface. The distance between the lines of resin composition is highly dependent upon other variables, such as temperature of the resin composition and/or the molding surface, the type of resin composition used, the geometry of the molding surface, as well as other factors.

The resin composition used in the present inventive method should be flowable and curable. In the present inventive method, the flowable, curable resin composition may be curable by a free radical polymerization mechanism. Free radical polymerization can occur by exposure to radiation or by exposure to heat. The types of radiation that can be used include electron beam, ultraviolet light, or visible light.

Illustrative examples of materials suitable for the flowable, curable resin composition of the present invention are those resin compositions that are capable of being polymerized by a free radical polymerization mechanism by exposure to radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Suitable resins may be blends of photoinitiator and at least one compound bearing an acrylate group.

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of resins that may be used in the present invention.

Ethylenically unsaturated resins include both monomeric and polymeric compounds that contain atoms of carbon, hydrogen and oxygen, and optionally nitrogen, sulfur, and halogens. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, aid unsaturated carboxylic acids, such as acrylic acid, methacrylic acid, itaconic acid, crotonic acid, isocrotonic acid, maleic acid, and the like. Such materials are typically readily available commercially and can be readily polymerized.

Some illustrative examples of compounds having an acrylic or methacrylic group that are suitable for use in the invention are listed below:

(1) Monofunctional compounds:
ethylacrylate, n-butylacrylate, isobutylacrylate, 2-ethylhexylacrylate, n-hexylacrylate, n-octylacrylate, isooctyl acrylate, bornyl acrylate, tetrahydrofurfuryl acrylate, 2-phenoxyethyl acrylate, and N,N-dimethylacrylamide;

(2) Difunctional compounds:

1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional compounds:

trimethylolpropane triacrylate, glyceroltriacrylate, pentaerythritol triacrylate, pentaerythritol tetraacrylate, and tris(2-acryloyloxyethyl) isocyanurate.

Some representatives of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

If the resin composition is to be cured by radiation, other than by electron beam, then a photoinitiator should be included in the resin composition. If the resin composition is to be cured by thermal means, then a thermal initiator should be included in the resin composition.

Illustrative examples of photoinitiators that can be blended in the resin composition of the present invention include the following: benzil, methyl o-benzoate, benzoin, benzoin ethyl ether, benzoin isopropyl ether, benzoin isobutyl ether, etc., benzophe none/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. The compounds may be used individually or in combination.

Cationically polymerizable materials include, but are not limited to, materials containing epoxy and vinyl ether functional groups. These systems are photoinitiated by onium salt initiators, such as triarylsulfonium, and diaryliodonium salts.

In some embodiments of the present inventive process, the resin composition may be heated. The heating effectively lowers the viscosity of the resin composition, which allows it to flow more quickly or easily across the molding surface. The type of resin composition and whether or not it is heated depends upon the desired viscosity of the resin composition to effectively wick or flow along the grooves on the molding surface. It may not be necessary, for example, to heat some resin compositions if their viscosities are low enough to flow along the grooves with or without heating of the molding surface.

The resin composition may be heated, or have its temperature controlled, in a variety of ways. For example, the resin composition may be heated in a container prior to being applied to the molding surface. The container may have a coil around it that has heated water that flows through the coil. In addition to the container being heated, the hose through which the resin composition flows to the die may be electrically heated, for example. In addition, the die may also be electrically heated to control the temperature of the resin composition before or as it is being applied to the molding surface. Although methods of heating the resin composition are included, the inventive process is not limited to the methods of heating the resin composition included herein. It is also possible that the process may include one or more of these ways of heating the resin composition.

In another embodiment of the present inventive process, the resin composition may be heated in addition to the molding surface of the tool being heated. The heating of both the resin composition and the molding surface allows the resin composition to have a lower viscosity and flow more quickly and easily across the molding surface. The heating allows the speed of the inventive process to be increased.

Die

A die can be used, in the present inventive process, to apply the resin composition to the molding surface of the tool. The coating die used in the examples of the present invention comprised a die with a series of round orifices. The holes or orifices are arranged along the face of the coating die in a direction substantially perpendicular to a direction in which the resin composition for a composite article will be coated. The spacing of the holes can be chosen so the interval or distance between the lines of resin composition can be varied. The examples below include specific information about the diameter of the holes and the spacing or intervals used between the holes, and are representative of the diameter and spacing that may be used in the present inventive process.

The position of the die may be adjusted in the present inventive process to enable the best results. The die may be placed at different angles to or at different distances from the molding surface, for example.

It is possible that other methods and/or equipment known to those skilled in the art, other than a die, may be used to apply resin composition to the molding surface in lines. The present invention, therefore, is not limited to those disclosed herein.

Substrate

Third, the process comprises contacting said resin composition with a first major surface of a substrate having first and second major surfaces. The resin composition should adhere to the substrate. The substrate may either be a sheet or a film. Whether a film or sheet is used depends upon whether the process used is batch or continuous. For example, a film on a roll could be used for the continuous process, whereas individual sheets of the substrate could be used in a batch process.

Suitable qualities of the film or sheet of substrate also depend upon the process that is used to cure the resin composition. In some embodiments of the present inventive method, the substrate should be a tough, flexible transparent film or sheet. In other embodiments, transparency of the substrate is necessary if the process includes curing the resin composition through the substrate.

Some illustrative examples of material that may be used for the film or sheet of substrate are polycarbonate, cellulose acetate butyrate, cellulose acetate propionate, poly(ether sulfone), poly(methyl methacrylate), polyurethane, polyester, poly(vinylchloride), glass, metal and mixtures and combinations thereof.

The first major surface of the substrate contacts with resin composition that is on the molding surface of the tool. By this time, the resin composition should have spread across, and substantially filled the grooves on, the molding surface.

In the case of some substrates that may be used in this invention, the surface of the substrate may first have to be primed in order for the resin composition to adhere to the substrate. One example of a substrate that may need to be primed is polyester. However, polyester that is already primed is commercially available. On the other hand, an example of one substrate that does not need to be primed for the resin composition to adhere is polycarbonate.

Curing

Fourth, the process comprises curing the resin composition. The resin composition may be cured by a free radical polymerization mechanism. One such free radical polymerization mechanism comprises exposing the resin composition to actinic radiation. This curing technique is well known and widely used in the art of radiation addition polymerization (e.g., see U.S. Pat. No. 3,700,643). One type of radiation is ultraviolet radiation. Typically, ultraviolet radiation is produced by such sources as mercury arc lamps, sunlamps, or xenon lamps. UV radiation primarily in the regions of about 2000 to 4000 A, will be most useful. Another type of radiation is electron beam radiation. Ionizing radiation produced by electron accelerators can be used wherein the electrons are provided with the kinetic energy derived from acceleration through an electrical field varying from 150 kilovolts up to as high as 4000 kilovolts.

Radiation processing equipment useful in the practice of this invention is commercially available, e.g., ultraviolet lamp systems sold by Radiation Polymer Corp., Plainfield, Ill., and Fusion Systems Corp., Greenbelt, Md., and ionizing radiation systems sold by Energy Sciences, Inc., Burlington, Mass., and Radiation Dynamics, Inc., Long Island, N.Y.

Another type of free radical polymerization mechanism is to use thermal energy. Heat lamps, or another source of heat, may be used to cure the resin composition.

In some embodiments of the present inventive method, curing of the resin will be performed by applying radiation through the tool. In such instances, the tool should be sufficiently transparent to permit irradiation of the resin therethrough. Illustrative examples of materials from which tools for such embodiments can be made include polyolefins and poly(methyl methacrylate).

As discussed above, the curing may take place through the substrate. In such cases, the substrate needs to be transparent.

Transferring

Fifth, the process comprises transferring the microstructure made of resin composition from the tool to the first major surface of the substrate. For this step to occur, the cured resin composition must adhere better to the substrate than to the tool, and be flexible enough to come off the tool. This allows the microstructure to adhere to the substrate and result in the microstructured composite article.

Illustrative Process

It will be apparent to one of ordinary skill in the appropriate art of producing composite microstructured articles that there are many suitable configurations for carrying out the process in accordance with the present invention. However, referring specifically to FIG. 1, there is a schematic drawing of an apparatus, shown generally at 20, for continuously casting and curing microstructured articles according to the process of the present invention. As shown in FIG. 1, substrate 21 is supplied to the process from roll 22 and after passing over roller 23, substrate 21 contacts the resin composition, which was previously applied to molding surface 25 of tool 27 in lines 24 by the coating die 26. The resin composition has since, however, moved across the molding surface to coat the surface and substantially fill the grooves. The resin composition extending above molding surface 25 of tool 27, if there is any, is controlled by setting the appropriate pressure or gap between roller 23 and tool 27. In this fashion, mechanical forces at the interface between roller 23 and tool 27 ensure that the desired amount of resin composition 24 extends above molding surface 25 of tool 27.

As shown in FIG. 1, radiation source 29 exposes the resin composition to radiation in a curing step. This could be substituted with some source of heat to cause curing by thermal means. As FIG. 1 illustrates, in this embodiment the radiation from radiation source 29 irradiates the resin composition through substrate 21, thus imposing a requirement that the substrate be "transparent" to the radiation in order for curing of the resin to be effected. As used in this sense, the term "transparent" means that the film must allow an effective proportion of the radiation impinging upon the film to be transmitted to the resin composition on the tool in order for curing to be accomplished at a practical rate. As can be appreciated by one of skill in the art, the selected substrate need not be completely transparent to all possible wavelengths of radiation that may be used in curing the resin composition. If the proportion of radiation that is transmitted through the substrate is relatively low, that can be compensated for, within limits, by a slower rate of feeding components through the system, selection of resin compositions, incorporation of selected photointiator(s) in the resin composition, etc. However, practical considerations impose realistic limits on the rate of feed-through of the component materials in the fabrication of the microstructured composite articles of the present invention. Alternatively, curing can be performed by irradiation through a tool if the tool is sufficiently transparent to the selected radiation type is used. If desired, curing through both the tool and substrate may be used.

The last step of the process is transferring the microreplicated microstructured surface to the substrate resulting in the composite article 31.

The configuration described above is just one possible configuration for carrying out the present inventive process, and there are other configurations possible that are not shown or described herein.

An alternative embodiment of the present invention includes coating the substrate. In this alternative method, lines of resin composition are coated on at least a portion of the molding surface of the tool, as shown in FIG. 1. In addition, at least a portion of the substrate is coated with resin composition prior to contact with the molding surface. One possible reason that this may be done is that certain portions of the molding surface may easily be kept bubble-free. They may be able to be replicated just by having resin composition on the portion of the substrate, which then comes in contact with the portion of the molding surface. However, a portion of the substrate could be coated through conventional means so that is has an additional coating of resin composition before it comes in contact with the molding surface and the lines of resin composition on the molding surface. It may act as a double coating method to result in a bubble-free composite article.

This double-coating method would require the use of a second die, or other piece of equipment, to apply the coating to the substrate. Such a die could possibly be located above the substrate as it comes off the roll, but before it comes into contact with the molding surface on the tool. However, other possibilities are also included in the present invention, even though they are not expressly listed in the application. This double coating method would provide more resin composition to ensure that no air bubbles result in the composite article. It is just one additional way to carry out the method of producing a bubble-free, microstructured composite article.

In the double-coating method, or the method of applying resin composition to at least a portion of the substrate prior to contact with the molding surface, the resin composition or the substrate itself, or both, may be heated, as discussed above.

EXAMPLES

Features and advantages of this invention are further illustrated in the following Examples. It is to be expressly understood, however, that the particular ingredients and amounts used as well as other conditions and details are not to be construed in a manner that would unduly limit the scope of this invention.

Test Methods

Microstructured samples were inspected for the presence of bubbles by visually inspecting the samples with the unaided eye at a distance of approximately 300 mm under ambient room lighting conditions. Samples were viewed both in transmission and reflection of the overhead fluorescent lights.

Coating and Curing Process

A free-radically curable resin composition was fed through a hose then through a die onto the top of a rotating heated tool, which was in the shape of a roll, configured with a molding surface. For some examples, the hose and/or die were heated. The die was configured with a linear row of multiple circular exit orifices having diameters of 508 microns (20 mils) and center-to-center spaces of 2030 microns (80 mils) unless otherwise stated.

The die was mounted to deposit continuous lines of the resin composition onto the molding surface. The gap between the die exit and the molding surface was approximately 254 microns (10 mils) unless otherwise stated. The resin composition spread out on the molding surface and adjacent lines of the resin composition coalesced before the resin composition contacted a substrate.

Unless noted otherwise, the resin composition that was used was composed of urethane acrylate oligomer (available as PHOTOMER 6210 from Cognis Corp., Kankakee, Ill.), tetrahydrofurfuryl acrylate (available as SR285 from Sartomer Company, Inc., Exton, Pa.), 1,6-hexanediol diacrylate (available as SR238 from Sartomer Company, Inc.), and photoinitiator (available as DAROCUR 4265 from Ciba Specialty Chemicals Corp., Tarrytown, N.Y.) in a weight ratio of 65/25/10/1.

The substrate passed around the bottom half of the tool, moving in the same direction as the molding surface. There were two rollers positioned at the 3 o'clock and 9 o'clock positions about the tool as the tool rotated in a counterclockwise manner. The substrate contacted the resin composition at a first nip point formed by the 9 o'clock roller and the molding surface. A coating bead was also formed at the nip point to smooth any irregularities in the resin composition as it contacted the substrate and formed a curable composite.

The curable composite was then cured by exposure to two sources of actinic radiation positioned to irradiate the composition as the tool rotated past its 5 and 7 o'clock positions. The source of actinic radiation was ultraviolet light supplied by D lamps in a Model F600 Fusion ultraviolet curing system available from Fusion UV Systems Inc., Gaithersburg, Md. Each row of lamps contained two lamps positioned perpendicular to the rotational direction of the tool. The distance between the lamps and the tool was set so that the surface of the tool was at the focus of the lamps. The first row of lamps at the 5 o'clock position was operated at 140 w/cm and the second row of lamps at the 7 o'clock position was operated at 240 w/cm. Radiation passed through the substrate and into the resin composition to affect cure.

The cured composite being a replicate of the molding surface was pulled away from the molding surface after the composite passed through a second nip formed by the 3 o'clock roller and the molding surface. The composite was then examined for bubbles that would adversely affect performance.

Example 1–2 and Comparative Example 1–2

A patterned cured composition was applied to a substrate using the Coating and Curing Process of the invention. The exit orifices of the coating die were spaced 1530 microns (60 mils) apart. The molding surface had a radial Fresnel pattern that measured 432 mm (17 in.) in the down-web direction and 330 mm (13 in.) in the cross-web direction, and had a maximum groove depth of 76 microns (3.0 mils). The substrate was biaxially oriented polyethylene terephthalate (PET) (available as MELINEX 505P having a thickness of 127 microns (5 mils) and available from Dupont Teijin Films, Wilmington, Del.). Operating conditions are shown in Table 1.

Example 2 was made as Example 1 except the substrate was polycarbonate (available as MAKROFOL DE6-2 having a thickness of 254 microns (10 mils) and available from Bayer Corporations, Pittsburgh, Pa.) and the radial Fresnel pattern had a maximum groove depth of 38 microns (1.5 mils). Operating conditions are shown in Table 1.

Comparative Example 1 was made as Example 1 except the resin composition was applied to the molding surface as a continuous sheet of material. Operating conditions are shown in Table 1.

Comparative Example 2 was made as Example 1 except the resin composition was applied as a continuous sheet of material onto the surface of the PET substrate before contacting the molding surface. The coated side of the substrate contacted the molding surface of the heated tool as the coated substrate passed through the first nip formed by the first roller and the heated tool with the molding surface. Operating conditions are shown in Table 1.

The cured materials were examined for bubbles. No bubbles were observed for Example 1 or Example 2. Bubbles were, however, observed for Comparative Example 1 and Comparative Example 2.

TABLE 1

| Example | Hose Temp °C. (° F.) | Die Temp °C. (° F.) | Tool Temp °C. (° F.) | Speed of substrate and molding surface m/min (fpm) | Bubbles |
|---|---|---|---|---|---|
| 1 | 49(120) | 49(120) | 60(140) | 15.2 (50) | No |
| 2 | 60(140) | 60(140) | 60(140) | 15.2 (50) | No |
| CE-1. | 49(120) | 49(120) | 60(140) | 15.2 (50) | Yes |
| CE-2 | 49(120) | 49(120) | 60(140) | 15.2 (50) | Yes |

Example 3 and Comparative Example 3–4

In Example 3, a patterned cured article was prepared using the Coating and Curing Process of the invention. The exit orifices of the coating die were spaced 1530 microns (60 mils) apart. The molding surface had a "v" groove pattern extending across the tool in the cross web direction. The groove pattern had a cross web width of 508 mm (20 in.), the grooves were adjacent to each other in the down web direction, and had an angle formed by the joining of a forward face (the face of the groove facing in the down web direction) and a rearward face (the face of the grooves facing opposite the down web direction) of 90 degrees and a groove depth of 24 microns (1 mil). The forward face forms an angle of 38 degrees relative to vertical. The rearward face forms an angle of 52 degrees relative to vertical. The substrate was biaxially oriented polyethylene terephthalate (available as MELINEX 505P having a thickness of 127 microns (5 mils)). Operating conditions are shown in Table 2.

Comparative Example 3 was made as Example 3 except the resin composition was applied to the molding surface as a continuous sheet of material. Operating conditions are shown in Table 1.

Comparative Example 4 was made as Example 3 except the resin composition was applied as a continuous sheet of material onto the surface of the PET substrate before contacting a molding surface. The coated side of the substrate contacted the molding surface on the heated tool as the coated substrate passed through the first nip formed by the first roller and the heated tool. Operating conditions are shown in Table 2.

The cured materials were examined for bubbles in the cured material. No bubbles were observed for Example 3, but bubbles were observed for Comparative Example 3 and Comparative Example 4.

TABLE 2

| Example | Hose Temp °C. (°F.) | Die Temp °C. (°F.) | Tool Temp °C. (°F.) | Speed of substrate and molding surface m/min (fpm) | Bubbles |
|---|---|---|---|---|---|
| 3 | 60(140) | 60(140) | 60(140) | 30.5 (100) | No |
| CE-3 | 60(140) | 60(140) | 60(140) | 30.5 (100) | Yes |
| CE-4 | 60(140) | 60(140) | 60(140) | 30.5 (100) | Yes |

Example 4

In Example 4, a patterned cured article was prepared using the Coating and Curing Process of the invention. The resin composition was composed of urethane acrylate oligomer (available as PHOTOMER 6210), tetrahydrofurfuryl acrylate (available as SR285), 1,6-hexanediol diacrylate (available as SR238), photoinitiator (available as DAROCUR 4265) and a surfactant (available as FLUORAD FC-430 from 3M Company, St. Paul, Minn.) in a weight ratio of 65/25/10/1/1. The curable composition was pumped through a hose and die both heated to 27° C. (80° F.) and coated in continuous lines onto the molding surface heated to 82° C. (180° F.) at 18.3 m/min (60 fpm). The exit orifices of the coating die were spaced 1530 microns (60 mils) apart. The molding surface had a radial Fresnel pattern that had a maximum groove depth of 76 microns (3.0 mils). The substrate was biaxially oriented polyethylene terephthalate (available as MELINEX 617 having a thickness of 127 microns (5 mils) and available from Dupont Teijin Films). The cured material was examined for bubbles and no bubbles were observed.

Example 5

Example 5 was made as Example 4 except the resin composition was applied to the molding surface that was only heated to 27° C. (80° F.), which is room temperature. The cured material was examined for bubbles and bubbles were observed. This example, as compared to example 4, demonstrates that heating the molding surface above room temperature helps to produce microstructured composite articles that are bubble free.

Example 6

In Example 6, a patterned cured article was made using the Coating and Curing Process of the invention. A lower viscosity resin composition was used that was composed of urethane acrylate oligomer (available as PHOTOMER 6210), 2 (2-ethoxyethyoxy) ethylacrylate (available as SR 256 from Sartomer Company, Inc.) 1,6-hexanediol diacrylate (available as SR238), and photoinitiator (available as DAROCUR 4265) in a weight ratio of 43/43/14/1. The resin composition was pumped through a hose and die both at 24° C. (75° F.) and coated in lines onto the molding surface that was at 24° C. (75° F.), which is about room temperature, at a speed of 39.6 m/min (130 fpm). The molding surface had a "v" groove pattern extending across the tool in the cross web direction, The groove pattern had a cross-web width of 508 mm (20 in.), the grooves were adjacent to each other in the down web direction, an angle formed by the joining of a forward face and a rearward face of 90 degrees, and a groove depth of 32.5 microns (1.3 mils). The forward face and a plane running parallel to a groove and perpendicular to the tooled surface formed an angle of 45 degrees, relative to vertical. The rearward face and a plane running parallel to a groove and perpendicular to the molding surface also formed an angle of 45 degrees, relative to vertical. The substrate was biaxially oriented polyethylene terephthalate (available as MELINEX 453 having a thickness of 127 microns (5 mils)).

The cured material was examined for bubbles and bubbles were observed.

Example 7

Example 7 was made as Example 6 except the molding surface was heated to 32° C. (90° F.). The cured material was examined for bubbles and no bubbles were observed. This example, as compared to example 6, demonstrates that heating the molding surface above room temperature helps to produce microstructured composite articles that are bubble free.

Examples; 8–15

In Examples 8–15, the curable resin composition was pumped through a hose and die both heated to 38° C. (100° F.) and coated onto the molding surface heated to 38° C. (100° F.) at a speed of 15.2 m/min (50 fpm). The molding surface had a "v" groove pattern extending across the tool in the cross web direction. The groove pattern had a cross-web width of 508 mm (20 in.), the grooves were adjacent to each other in the down web direction, an angle formed by the joining of a forward face and a rearward face of 90 degrees and a groove depth of 32.5 microns (1.3 mils). The forward face and a plane running parallel to a groove and perpendicular to the molding surface form an angle of 45 degrees, relative to vertical. The rearward face and a plane running parallel to a groove and perpendicular to the molding surface form an angle of 45 degrees, relative to vertical. The substrate was biaxially oriented polyethylene terephthalate (available as Melinex 453 having a thickness of 125 microns (5 mils)). Operating conditions are summarized in Table 3.

The cured materials of Examples 8–15 were inspected for the presence of bubbles by visually inspecting the samples with the unaided, or naked, eye at ambient room lighting conditions. The presence or absence of bubbles is listed in Table 3.

For this resin and for these operating conditions, the resin was coated onto the molding surface in non-continuous lines at a die-to-tool gap of 50 microns, resulting in bubbles in the cured resin composition. However, the close proximity of the die to the molding surface resulted in nearly a continuous sheet of resin composition being coated onto the molding surface. For die-to-tool gaps of 100 to 200 microns using this resin composition and operating conditions, continuous lines were coated onto the molding surface and no bubbles were observed in these cured compositions. For larger die-to-tool gaps discontinuous stripes of resin were coated onto the tool and no bubbles were observed in these cured compositions.

TABLE 3

| Example | Die-to-tool Gap microns (mils) | Continuous Stripes | Bubbles |
|---|---|---|---|
| 8 | 50 (2) | No | Yes |
| 9 | 100 (4) | Yes | No |
| 10 | 150 (6) | Yes | No |
| 11 | 200 (8) | Yes | No |
| 12 | 250 (10) | No | No |
| 13 | 380 (15) | No | No |
| 14 | 510 (20) | No | No |
| 15 | 1270 (50) | No | No |

Example 16

This example illustrates the double-coating method by coating continuous lines of resin composition onto the molding surface while also coating a continuous sheet of resin composition onto the substrate. Approximately half of the resin composition was pumped through a hose and die both heated to 60° C. (140° F.) and coated as continuous lines onto the molding surface heated to 82° C. (180° F.) at 9.1 m/min (30 fpm). The molding surface had a radial Fresnel pattern that had a maximum groove depth of 76 microns (3.0 mils). The other half of the curable resin composition was coated as a continuous film onto the substrate prior to contacting the molding surface. The resin composition was coated onto a span of substrate supported by two rollers using a coating die with an internal distribution system. The coating die system had one hose that fed the resin composition into an enclosed manifold, which then distributed the resin composition out through holes in the external part of the die. The resin composition was supplied to the coating die at the desired flow rate with a WATSON-MARLOW model 505u pump (available from Watson-Marlow, Inc., Wilmington, Mass.). The substrate was biaxially oriented polyethylene terephthalate (available as MELINEX 617 having a thickness of 127 microns (5 mils) and available from Dupont Teijin Films).

Upon inspection, no bubbles were observed in the cured resin composition.

Various modifications and alterations of this invention will become apparent to those skilled in the art without departing from the scope and spirit of this invention.

What is claimed is:

1. A process for producing a microstructured composite article, said process comprising:
    providing a tool compromising a molding surface that is suitable for forming a microstructure and which surface is heated to a temperature of at least 32° C.;
    applying to at least a portion of said molding surface a plurality of continuous lines of a flowable, curable resin composition that are not touching each other when applied to the molding surface but which flow together to substantially coat said portion of said molding surface;
    contacting said resin composition with a substrate;
    curing said resin composition; and
    transferring said resin composition to said substrate, said process yielding a substantially bubble-free cured resin.

2. The process as in claim 1 wherein said flowable, curable resin composition is cured by a free radical polymerization mechanism.

3. The process as in claim 1 wherein said substrate is a sheet or film, and it is conveyed through the process at a speed of at least 39.6 meters per minute.

4. Th process as in claim 1 in which said molding surface is heated to a temperature of at least 38° C.

5. The process as in claim 4 wherein said substrate is a sheet or film, and it is conveyed through the process at a speed of at least 15.2 meters per minute.

6. The process as in claim 1 wherein said molding tool temperature is at least 60° C.

7. The process as in claim 1 wherein said substrate is a film or sheet that comprises a material that is selected from a group consisting of a polycarbonate, cellulose acetate butyrate, cellulose acetate propionate, poly(ether sulfone), poly(methyl methacrylate), polyurethane, polyester, poly(vinylchloride), glass, metal and mixtures and combinations thereof.

8. The process as in claim 1 wherein said tool is in the shape of a roll, said substrate is continuously fed to said tool, and said molding surface comprises a plurality of grooves extending across the molding surface in a cross-web direction.

9. The process as in claim 8 wherein said plurality of grooves are cross-hatched in shape.

10. The process as in claim 8 wherein said plurality of grooves are sinusoidal in shape.

11. The process as in claim 1 wherein said tool comprises a transparent material.

12. The process as in claim 1 wherein said tool is in the shape of a roll and said substrate is continuously fed to said tool.

13. A process for producing a microstructured composite article, said process comprising:
    providing a tool comprising a molding surface comprising a plurality of grooves that are suitable for forming a microstructure said surface being heated to a temperature of at least 32° C.;
    applying to at least a portion of said molding surface a plurality of lines of a flowable, curable resin composition that flow together to substantially coat said at least a portion of said molding surface;
    applying to at least a portion of a substrate said flowable, curable resin composition;
    contacting said resin composition on said molding surface with said substrate after resin composition is applied to said substrate;
    curing said resin composition; and
    transferring said resin composition on said molding surface to said substrate, said process yielding a substantially bubble-free cured resin.

14. The process of claim 13 wherein said lines of said resin composition applied to said molding surface are continuous.

15. The process of claim 13 wherein said substrate is a sheet or film, and it is conveyed through the process at a speed of at least 9.1 meters per minute, and said flowable, curable resin composition applied to said substrate is applied as a continuous layer.

16. The process of claim 13 and further comprising heating said molding surface to a temperature of at least 82° C.

17. The process of claim 13 and further comprising heating said flowable, curable resin composition before applying said resin composition.

18. The process of claim 17 and further comprising heating said molding surface to a temperature of at least 82° C.

19. A process for making a microstructured composite article, said process comprising:
- a) providing a tool having a molding surface suitable for forming a microstructure on a moving web, said surface being heated to a temperature of at least 32° C.;
- b) applying to said molding surface a plurality of lines of a curable resin which lines do not touch each other when applied to the molding surface, but which flow together to substantially coat at least a portion of said molding surface, said curable resin consisting essentially of a resin composition selected from the group consisting of
  - i) urethane acrylate oligomer, tetrahydrofurfuryl acrylate, 1,6-hexanediol adiacrylate and photoinitiator in a weight ratio of 65/25/10/1; and
  - ii) urethane acrylate oligomer, 2(2-ethoxyethoxy) ethylacrylate, 1,6-hexanediol diacrylate and photoinitiator in a weight ratio of 43/43/14/1;
- c) contacting said resin composition with a substrate film conveyed through said process, said substrate comprising a polymer selected from the group consisting of polyethylene terephthalate and polycarbonate;
- d) curing said resin composition; and
- e) transferring said resin composition to said substrate, said process yielding a substantially bubble-free cured resin.

* * * * *

UNITED STATES PATENT AND TRADEMARK OFFICE
CERTIFICATE OF CORRECTION

PATENT NO. : 6,758,992 B2
DATED : July 6, 2004
INVENTOR(S) : Solomon, Jeffrey L.

It is certified that error appears in the above-identified patent and that said Letters Patent is hereby corrected as shown below:

<u>Title page,</u>
Item [57], ABSTRACT,
Line 11, delete "is that is that" and insert in place thereof -- is that --.

<u>Column 3,</u>
Line 9, delete "conditions:" and insert in place thereof -- conditions; --.

<u>Column 4,</u>
Line 17, delete "If tool" and insert in place thereof -- If the tool --.

<u>Column 6,</u>
Line 57, delete "aid" and insert in place thereof -- and --.

<u>Column 14,</u>
Line 16, delete "direction," and insert in place thereof -- direction. --.
Line 41, delete "Examples; 8-15" and insert in place thereof -- Examples 8-15 --.

<u>Column 16,</u>
Line 11, delete "Th" and insert in place thereof -- The --.

<u>Column 17,</u>
Line 18, delete "of" and insert in place thereof -- of: --.

Signed and Sealed this

Nineteenth Day of July, 2005

JON W. DUDAS
*Director of the United States Patent and Trademark Office*